UNITED STATES PATENT OFFICE.

JOHN MYERS, OF ADAMS, (GREEN SPRING P. O.,) OHIO.

IMPROVEMENT IN METHODS OF CURING FOOT-ROT IN SHEEP.

Specification forming part of Letters Patent No. 222,723, dated December 16, 1879; application filed September 12, 1879.

*To all whom it may concern:*

Be it known that I, JOHN MYERS, of Adams, (Green Spring P. O.,) in the county of Seneca and State of Ohio, have invented a new and Improved Method of Curing Foot-Rot in Sheep, of which the following is a specification.

The object of this invention is to furnish a method of curing foot-rot in sheep, which shall be effective, and may be applied easily and at small expense.

The invention consists in a method of curing foot-rot in sheep by subjecting the feet of the sheep to a bath consisting of concentrated lye, and afterward subjecting the feet to a bath consisting of a mixture of blue vitriol and vinegar, as will be hereinafter fully described.

In carrying my invention into practical effect, I first subject the feet of the sheep to a bath of lye concentrated to such a strength that it will bear up an egg. This bath may be applied by driving the sheep through a trough containing the lye. The trough should contain sufficient lye to rise above the hoofs and cover the diseased parts of the sheep's feet, and the said trough should be so arranged that the sheep cannot avoid walking in the lye when being driven through the trough.

After twenty-four hours the feet of the sheep are subjected to a bath consisting of a mixture of blue vitriol (sulphate of copper) and vinegar, in the proportions of two ounces of blue vitriol to one quart of vinegar. The mixture of blue vitriol and vinegar is applied to the feet of the sheep by placing a suitable quantity of the mixture in a trough, and driving the sheep through the trough, so that they will be compelled to walk in the mixture, and thus bathe their feet.

In ordinary cases one application of the substances mentioned will be sufficient; but in bad cases two or more applications, at intervals of about two weeks, may be required.

I am aware that all three of the elements used by me are old and well known; but they have never been used in the manner, in the same relation to each other, or for the same purpose.

Having thus described my invention, what I claim as new, and desire to secure by Letters Patent, is—

The method of curing foot-rot in sheep by subjecting the feet of the sheep to a bath consisting of concentrated lye, and afterward subjecting the feet to a bath consisting of a mixture of blue vitriol and vinegar, substantially as herein shown and described.

JOHN MYERS.

Witnesses:
WILLIAM ROSS,
JOHN S. MYERS.